Oct. 20, 1970  J. F. HINRICHS  3,535,489
ELECTRON BEAM WELDING APPARATUS
Filed May 3, 1968 2 Sheets-Sheet 1
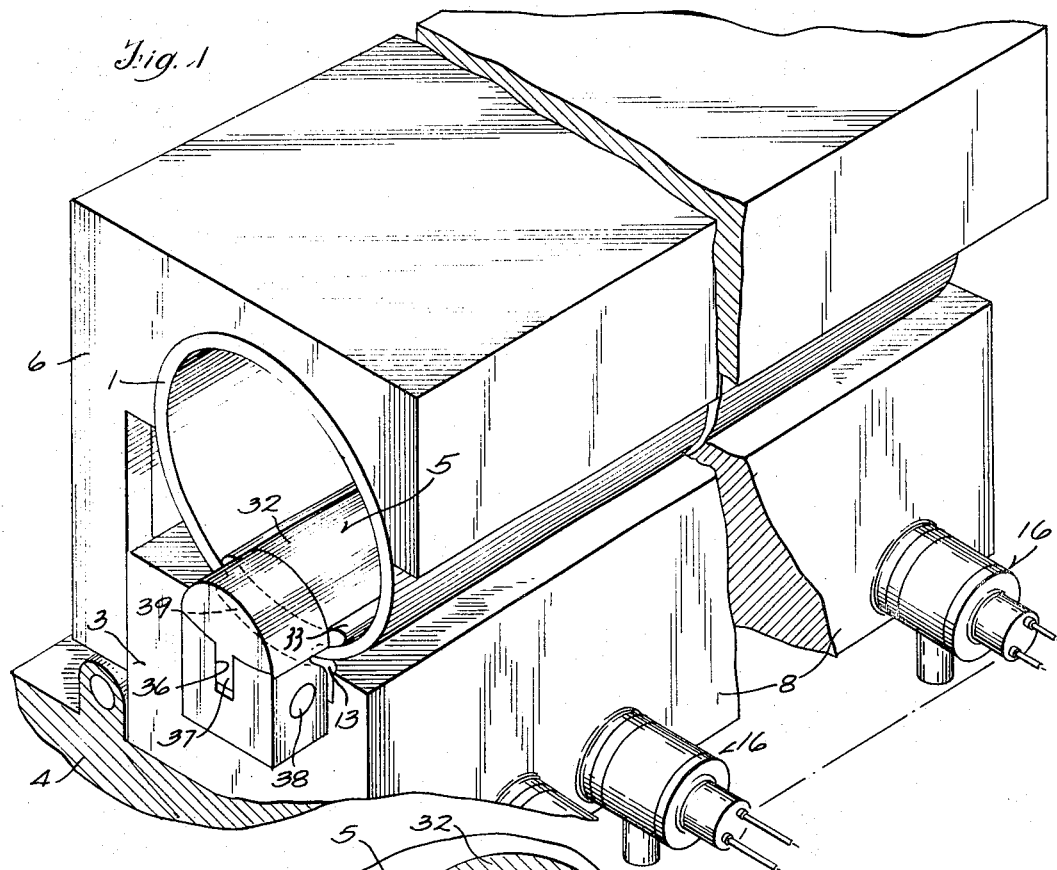
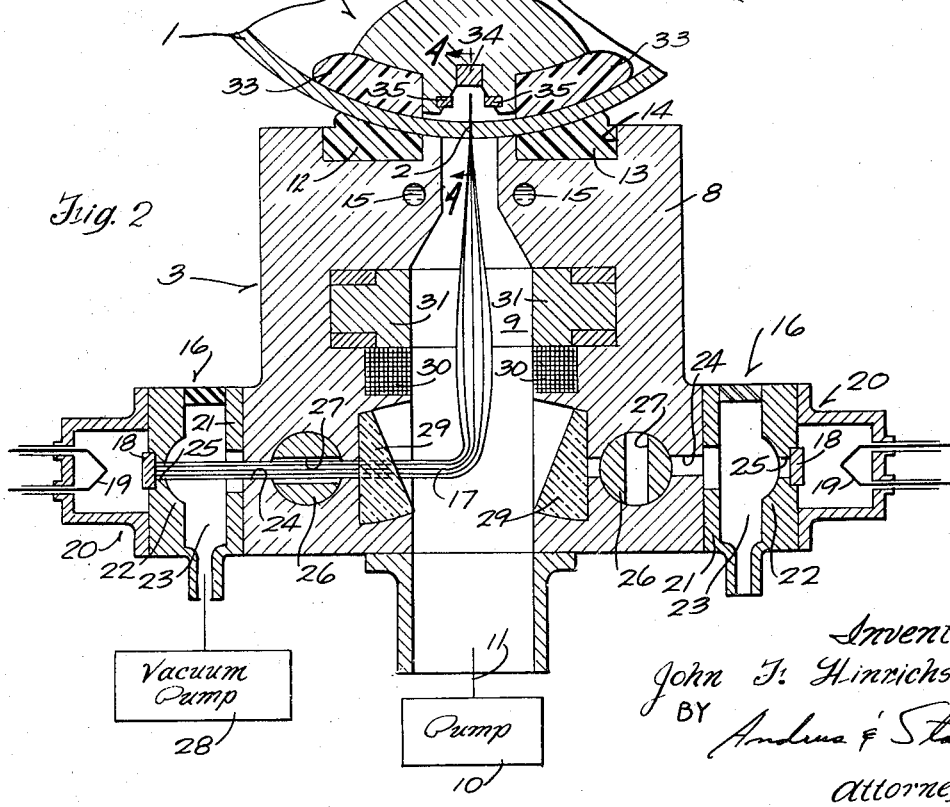
Inventor
John F. Hinrichs
BY Andrus & Starke
Attorneys Oct. 20, 1970  J. F. HINRICHS  3,535,489

ELECTRON BEAM WELDING APPARATUS

Filed May 3, 1968  2 Sheets-Sheet 2

Inventor
John F. Hinrichs
By Andrus & Starke
Attorneys

United States Patent Office 3,535,489
Patented Oct. 20, 1970

3,535,489
ELECTRON BEAM WELDING APPARATUS
John F. Hinrichs, Menomonee Falls, Wis., assignor to A. O. Smith Corporation, Milwaukee, Wis., a corporation of New York
Filed May 3, 1968, Ser. No. 726,341
Int. Cl. B23k *15/00*
U.S. Cl. 219—121                                    2 Claims

ABSTRACT OF THE DISCLOSURE

A plurality of electron beam guns are spaced in accordance with a weld line. For welding of a longitudinal seam of a tubular pipe member, an inner seal assembly and an outer seal assembly are disposed to the opposite sides of the seam with a welding chamber and a plurality of electron beam welding guns mounted to opposite sides of the weld line.

---

The electron guns to one side are simultaneously or sequentially actuated to establish a series of individual welds which are deflected along the seam to overlap and form a continuous weld.

The side and cross members of a vehicle frame may be mounted in a fixture within a welding chamber and a plurality of electron welding guns arranged for simultaneous welding of the several components of the frame. A loading station and an unloading station is mounted to the opposite sides of the welding station and connected thereby a vacuum lock transfer station. The welded frame is coated with a protective metal such as aluminum or zinc by passing the welded frame through a metal vapor depositing chamber disposed immediately in-line following the welding chamber.

This invention relates to an electron beam welding apparatus and particularly to the creation of an elongated weld such as the longitudinal seam of a tubular member, the interconnecting line of vehicle frame components and the like.

Electron beam welding has certain advantages over the more conventional arc welding so widely employed in industry. Electron beam welding eliminates the need for welding wire, the conventional shielding gas and other similar components. Electron beam welding as such is also extremely rapid and can be readily automated to eliminate the necessity of skilled operators while maintaining highly satisfactory final welds. Further, the automated equipment, although relatively expensive initially and requiring a substantial initial investment, requires a minimal amount of maintenance and is adapted therefore to volume production.

Applicant's copending application entitled Electron Beam Welding of Rimmed Carbon Steel which was filed Jan. 6, 1967 with Ser. No. 607,826 particularly discloses an improved electron beam welding method and apparatus for the welding of low carbon steel such as employed in vehicle frames and tubular pipes for gas lines.

Generally, where elongated welds are required, the prior practice has been to provide a relative movement between the electron gun and the workpiece with a sliding seal therebetween. This eliminates the necessity for maintaining a complete and vacuum environment for the complete workpiece. The sealing of such a movable device however resulted in expensive and time consuming problems and the length of the weld that could be made with any given setup was seriously limited. Other systems have suggested the provision of a zipper-type seal held in place by a suitable pressure sensitive adhesive or the like. This has the advantage of allowing the moving seal area to be located away from the weld joint while eliminating some of the disadvantages associated with a true moving seal. Generally, such systems have encountered certain problems, however, in maintaining accurate sealing arrangements particularly through the unwelded portion.

The present invention is particularly directed to the provision of a multiple electron beam apparatus which is adapted to complete an elongated weld without the necessity of a single complete vacuum or the usual travelling seals which have been suggested in connection with elongated weld areas. Applicant has found that in fact a plurality of individual welds from separate guns can be established and, particularly by slight overlapping, a continuous weld of exceptional character can be obtained.

Generally, in accordance with the present invention, the plurality of electron beam guns are spaced in accordance with the weld line. The weld gun is mounted with a valve means between the accelerating chamber of the electron beam gun and a welding chamber. This permits establishment of a relatively high vacuum in the acceleration chamber and protects the cathode filament from oxidation. The valve is opened during the welding process. The workpiece is clamped in position with a single welding chamber provided to opposite sides of the complete weld area. The valve means between the acceleration chambers of the individual guns and the welding chamber is opened and the electron guns simultaneously or sequentially actuated to establish a series of individual welds which can be overlapped to form a continuous weld. Each of the guns is arranged with a suitable means to deflect the welding beam along a predetermined length of the final weld and particularly to provide the slight overlap of the adjacent weld. Applicant has found that the final weld is equally as good as a single continuous weld as provided by establishing relative movement between the welding gun and the work.

In a particularly unique application for welding of elongated tubular pipe members, an inner seal assembly and an outer seal assembly are disposed to the opposite sides of the longitudinal seam or weldment and interconnected at the opposite ends to completely close the weld seam. The one seal assembly is provided with a welding chamber and a plurality of electron beam welding guns to one or both sides. A gate or valve unit separates the weld chamber from the electron beam acceleration chamber of the guns. After the pipes have been assembled between the two seal assemblies the electron beams are simultaneously or sequentially actuated to establish a weld in accordance with a predetermined area. Each of the electron beams is deflected along the line of the weld edges or area sufficiently to overlap with the immediately adjacent electron welding beam.

The multiple gun construction of this invention can also be applied to the simultaneous welding of a plurality of parts. For example, in the welding of a frame member, a plurality of side and cross members must be interconnected. In accordance with the concept of the present invention, a fixture would be provided within a welding chamber within which all of the parts would be assembled. A plurality of electron welding guns are interconnected as a part of the assembly to provide a plurality of weldments for simultaneously interconnecting the several components of the frame.

As a matter of practical commercial production, a loading and an unloading station may be provided to the opposite sides of a welding station and connected thereto by a vacuum lock unit to reduce the problems of maintaining the welding chamber under a sufficient vacuum for welding purposes. The completed frame unit can also be coated with a protective metal such as aluminum or zinc in a very convenient manner to eliminate the subsequent necessity of painting of the frame. Thus, a metal vapor depositing chamber can be provided immediately in-line following the welding chamber.

Thus, the present invention provides a highly satisfactory means of automated welding of elongated weld areas with an electron beam welding unit.

The drawings furnished herewith illustrate preferred applications and constructions of the present invention in which the above advantages and features are clearly disclosed as well as others which will be readily understood from the following description.

In the drawings:

FIG. 1 is a pictorial view of a pipe welding unit constructed in accordance with the present invention with a tubular pipe mounted therein for longitudinal welding of the seam;

FIG. 2 is an enlarged vertical section through a portion of FIG. 1 showing the mounting of the electron beam welding gun and the interconnection to the tubular pipe to be welded;

Figure 3:
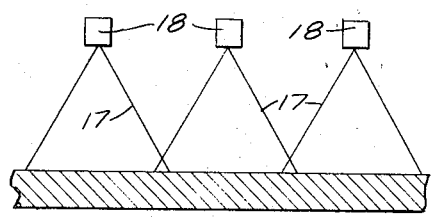
FIG. 3 is a diagrammatic illustration of the deflection pattern of the electron beams of the multiple electron beam welding apparatus.

Referring to the drawings and particularly to FIGS. 1 and 2, the invention is shown applied to the welding of a tubular pipe 1 and particularly the longitudinal seam 2 thereof. The pipe is formed from an elongated plate member which is rolled into the tubular configuration with the opposite longitudinal edges in abutting relation. The rolled plate is disposed within the pipe welding fixture which includes a lower electron beam welding gun and seal assembly 3 located on a suitable support 4. An inner seal and backup assembly 5 is disposed within the pipe extending longitudinally over the longitudinal weld 2 and interconnected at the outer ends to the assembly 3 to provide a complete enclosure of the longitudinal weld seam 2 as subsequently described. An L-shaped closing clamp 6 is pivotally supported to the support 4 and overlies the top of the pipe 1 to support the pipe within the assembly 3.

Referring particularly to FIG. 2 the electron beam welding gun and seal assembly 3 is shown in the illustrated embodiment of the invention as including a supporting housing 8 having a centrally extending weld chamber 9 aligned with the abutting weld seam 2 of the pipe 1. A vacuum pump 10 is connected, as diagrammatically shown by line 11, to chamber 9 to establish a vacuum suitable for electron beam welding. Normally, the pump need only be capable of drawing the chamber down to 100 microns of pressure or the like.

A pair of resilient sealing members or seals 12 and 13 are secured in the upper surface of the housing 8 to the opposite sides of the welding chamber 9 and therefore to the opposite sides of the abutting edges of weld seam 2. The seals 12 and 13 are held within suitable recesses 14 in the housing and project outwardly above the upper level of the housing to engage the adjacent surfaces of the pipe 1. The seals 12 and 13 may be formed of polyurethane or other similar resilient material which is adapted to form a vacuum-tight junction with the pipe 1 firmly clamped against the seals 12 and 13 by the pivotally mounted closing clamp 6. Cooling tubes 15 may also be embedded within the housing immediately adjacent to the seals and the welding chamber to provide cooling.

A plurality of electron beam guns 16 is secured to the lower portion of the housing 8 in laterally spaced array longitudinally of the pipe 1.

In the illustrated embodiment of the invention, similar electron beam welding guns 16 are shown in aligned relationship to the opposite sides of the housing 8. Each of the welding guns 16 is similarly constructed and a pair of opposed units are shown as a production suggestion. Normally, only the guns to the one side of the assembly will be employed. The oppositely disposed guns are maintained for replacement during repair and maintenance of the guns to the other side. As a result, even though one or more guns might require maintenance, the complete production fixture need not be shut down.

Each of the electron beam welding guns 16 is similarly constructed and mounted with respect to the housing as shown in FIG. 2 to establish an electron beam 17 extending generally perpendicular to the line of the weld and entering the weld chamber 9 from the one side. Each of the electron beam welding guns 16 includes an emitter 18 secured in spaced relation to a filament 19. The filament 19 is interconnected as a separate quick change subassembly 20 secured to the side of the electron beam gun 16. In accordance with the usual construction, an apertured anode 21 and a cathode 22 are secured in properly spaced relationship with each other and with respect to the emitter 18 and define the basic beam generating and accelerating chamber 23 of the gun secured to housing 8 with a beam passageway 24 aligned with an opening 25 in the anode and cathode. A cylinder valve 26 having an orifice 27 is mounted in passageway 24 and normally rotated to misalign the orifice 27 and thereby to seal the acceleration chamber 23. A vacuum pump 28 is connected to this chamber 23 and establishes a substantial vacuum of the order of $\frac{1}{10}$ of a micron. When a weld is to be established, pump 10 is actuated to establish a suitable vacuum in the welding chamber and the valve 26 is rotated to align the orifice 27 with the electron beam anode and cathode apertures 25 and the gun 16 is energized from any suitable power source to establish and create an electron beam 17 which enters the welding chamber 9 substantially perpendicular to the weld line.

A deflection magnet 29 is secured in the housing 8 immediately adjacent the welding chamber 9 and deflects the electron beam 90 degrees into alignment with the abutting edges 2. A focusing coil 30 in the wall of the welding chamber 9 encircles the path of the deflected beam 17 to provide predetermined focusing of the electron beam with respect to the abutting edges 2. Immediately following the focusing coil, deflection electromagnets 31 are provided for moving of the beam 17 along the weld line. The coil 30 and electromagnets 31 constitute control means which may be employed to deflect the beam along the three coordinate axes, X, Y and Z. Further, the control current is varied in relation to the magnetic deflection desired and thus, by using suitable energizing control program means, may be preprogrammed and automated.

After the complete assembly of the pipe 1 with respect to the seal assemblies 3 and 5, the electron beam guns 16 are sequentially or simultaneously energized to establish the electron beam 17. Each of the beams 17 is deflected along a part of the weld line 2 to define a generally partial coverage of the weld area and define a weld beam deflection pattern such as shown in FIG. 3. Each of the beams 17 scans a similar predetermined portion of the weld line with each of the beams slightly overlapping the immediately adjacent beam or beams, as shown in FIG. 3.

It has been found that this system provides a very reliable and sound weld seam.

The inner backup and seal assembly 5 includes a body portion 32 extending longitudinally through the pipe 1 with a generally triangular chamber aligned with the weld line 2.

Polyurethane or similar material seals 33 are secured to the opposite edges of the body 32 and provide a vacuum-tight seal against the pipe 1 with the inner backup and seal assembly 5 locked in place. An aluminum insert 34 is provided in the base of the recess 31 in precise alignment with the welding beam and the abutting edges. As disclosed in applicant's copending application, the aluminum backup provides an improved action on the weld characteristics.

Figure 4:
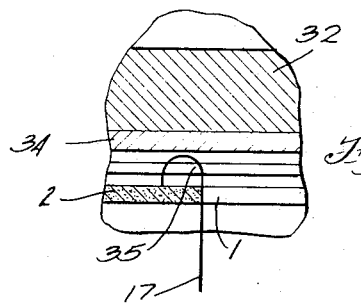
FIG. 4 is a view taken generally on line 4—4 of FIG. 2.

Further, the illustrated embodiment of the invention includes a novel means to post heat the weld, as most clearly shown in FIGS. 2 and 4. Reverse deflection magnets 35 are mounted within the walls of the recess in the body 32 inwardly of the insert 33. The magnets 35 bend the beam back upon itself, as most clearly shown in FIG. 4, into engagement with the underside of the weld. In addition to treatment of the weld, the insert 33 is not subjected to the full beam as a result of deflection of beam 17 and distortion or consummation of the insert is minimized.

In the illustrated embodiment of the invention, the inner and outer seal assemblies 3 and 5 project outwardly axially of the pipe 1 and have their ends interlocked by a mating slot 36 and projection 37 interconnected by a releasable pivot pin 38 or the like. The polyurethane seals extend laterally through the end locking extensions as at 39 to hermetically close the welding chamber 9 and permit maintenance of a suitable welding atmosphere.

In operation, the clamp 6 is pivoted counterclockwise as viewed in FIG. 1 to permit access to the seal assembly. The inner seal is released from the outer seal at either end. For purposes of discussion, it will be assumed that the right end of the assembly is disengaged and the inner seal assembly 5 raised to permit introduction of the formed pipe 1 between the seal assemblies 3 and 5. The clamp 6 is then pivoted into closing engagement with the outer periphery of the pipe 1 and forces it downwardly onto the outer seat assembly 3 with the edges 2 in abutting relationship. The inner seal assembly 5 is locked to the outer seal assembly 3 to vacuum-seal the welding chamber 9. A suitable vacuum is drawn on the welding chamber 9. The cylinder valve 26 is rotated to align the orifice 27 with the electron beam guns 16 which are then energized, simultaneously or in sequence, to establish the electron beams 17. The focusing coils 30 and the deflection coils 31 are suitably energized to properly focus the electron beam 17 and cause it to scan the appropriate portion of the weld line 2.

The present invention thus provides a highly satisfactory means for providing a sound weld of a tubular pipe member or any other elongated weld seam with essentially no distortion within the weld joint.

A further advantage of the present invention is particularly directed to the concept of providing welding of curved components. By suitable forming of the fixture for the guns 16, the weld line can be readily duplicated and the device clamped within an enclosing weld chamber which is held at a proper vacuum. The plurality of electron beams spaced about the device provides for accurate welding of the areas.

Figure 5:
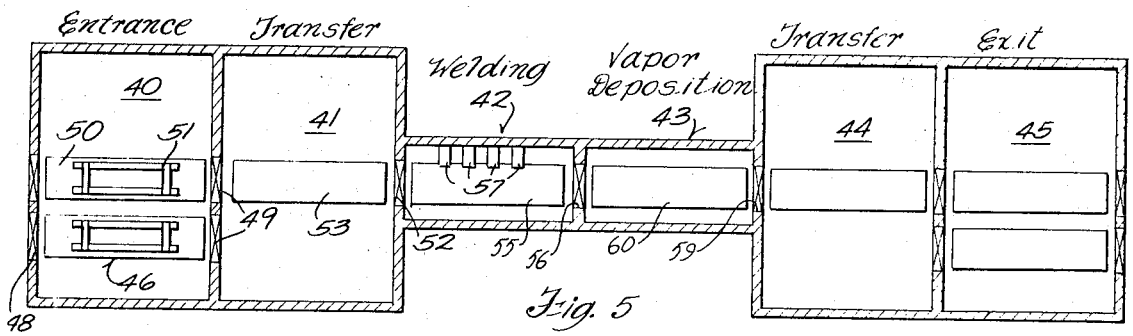
FIG. 5 is a diagrammatic plan view of the invention applied to the welding of a complete frame assembly.

Referring particularly to FIG. 5, an alternative embodiment of the present invention is shown employing a plurality of electron beam welding guns for simultaneously welding a complete frame structure.

Figure 6:
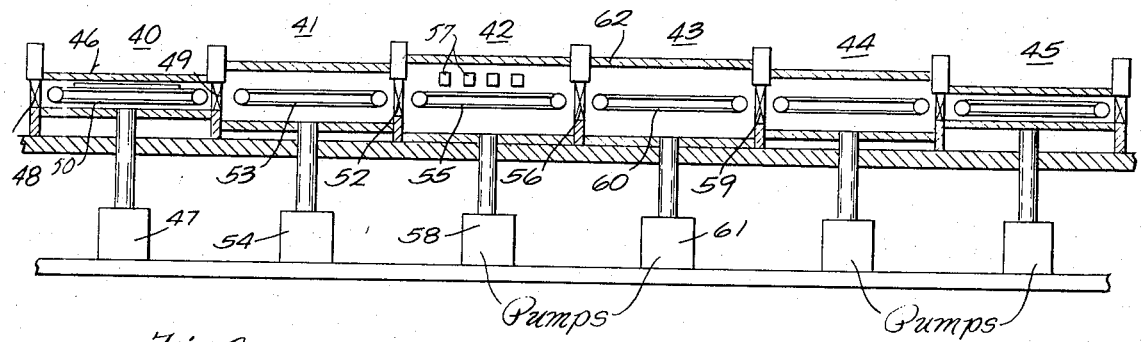
FIG. 6 is a side elevational view of FIG. 5.

In the embodiment of the invention illustrated in FIGS. 5 and 6, a complete line is diagrammatically shown and including an entrance or assembly station 40, a load transfer station 41, a welding station 42, a vapor depositing station 43, an unload transfer station 44 and an exit station 45.

The entrance and exit stations 40 and 45 similarly include a plurality of side-by-side lock chambers 46 each of which is connected to a mechanical pump 47 or other suitable means to reduce the pressure to 100 microns. A pair of lock chambers 46 is shown although in actual production a greater number may be desired to permit time for loading of the preassembled frame units into any one of the several chambers 46, pumping of the individual chamber and movement into the transfer station 41, as presently described. Thus, whereas the reduction of the vacuum in the load chamber may require a full minute, the frame units 51 may be completely welded in the order of six seconds.

The lock chambers 46 are constructed and the one is described, the lock chamber is sealed at the opposite ends by suitable vacuum gate valves 48 and 49 shown as sliding door units. Further, a conveyor 50 shown as an endless belt is provided to automatically move a frame unit 51 or the like through the chambers and into the transfer station. The preassembled frame unit 51 is mounted or assembled within the several locks and the vacuum is established.

The preassembled frame units 51 are transferred into the transfer station 41 which is sealed at the opposite ends by the gate valve 49 and a similar exit valve 52. A conveyor 53 in station 41 is movable laterally into alignment with the several entrance chambers 46 and the exit valve 52. The chamber or station 41 is held at a substantially greater vacuum than chambers 46; for example $\frac{1}{10}$ of a micron. Such vacuum can be readily maintained by continuous pumping with a proper mechanical and diffusion pump 54.

The framt units 51 are then sequentially fed through the gate valve 52 into the electron beam welding chamber or station 42 which is also provided with a conveyor 55 and closed at the far end by a valve 56. In this station, a substantial number of welding guns 57 are mounted, as diagrammatically illustrated, to simultaneously establish a plurality of different welds. A vacuum pump 58 is connected to the chamber to establish a vacuum of $\frac{1}{10}$ of a micron which is suitable for welding. The guns 57 can be simultaneously actuated to effect a weld of predetermined areas with adjacent beams overlapping to provide elongated welds in the same manner as previously described with the embodiment of FIGS. 1–4. Commercially available electron beam guns can each establish a weld of approximately 4 inches in length at a speed of approximately 40 inches a minute. In other words, each gun would take approximately 6 seconds to effect its weld. An automotive frame of a conventional construction normally takes between approximately 800 inches of weld. Thus, by properly locating 200 electron beam guns, the complete frame can be welded into a unitary structure in 6 seconds.

The electron beam process is capable of welding in any position and consequently the several channel sections, body brackets and intermediate cross bars of the usual vehicle frame can be all welded simultaneously into a completed welded frame. Further, as previously described, each weld gun can be controlled by a suitable programmed means to move the beam all through X, Y and Z coordinates and thus can move along a complex path.

After the completion of the welding process, the frame unit 51 is passed into the vapor depositing station 43 which is separated from the weld chamber by the valve 56 and closed at the far or exit end by a gate valve 59. The vapor depositing chamber 43 includes a conveyor 60 and is connected to vacuum pump 61 to hold a vacuum in the order of $\frac{1}{10}$ of a micron. Within the chamber 43, metal vaporizing and depositing unit 62 applies aluminum, zinc or any other material as a thin protective metallic film on the frame unit in accordance with well known techniques. After the complete coating of the frame unit, it passes through the exit gate valve 59 into the discharge transfer station 44 and the exit station 45 which respectively correspond to that of the load transfer station 41 and entrance station 40.

The present invention thus provides a very satisfactory means for the automatic control of production welding of multiple component items.

The advantage of using an electron beam welding system for automobile frames and the like is not only providing a practical means of simultaneously interconnecting a substantial number of the components but the support and arrangement of the electron beams can be conveniently and readily varied to accommodate model changes and the like. The only practical limitation on the system is that the frames to be welded must remain of such size as to pass through the several vacuum chambers and valves.

The present invention has been particularly described with the use of vacuum-type electron beam welding guns. However, the use of cold cathode electron beam welding apparatus or devices can also be employed within the broadest aspects of the present invention. The cold cathode devices in the present state of the art are generally experimental laboratory tools and thus not practical for actual commercial application.

The present invention provides a highly satisfactory means for adapting the electron beam welding system to production processes and particularly to mass produced welding of items such as tubular pipe, welded vehicle frames and the like.

Various modes of carrying out the invention are contemplated as being within the scope of the following claims, particularly pointing out and distinctly claiming the subject matter which is regarded as the invention.

I claim:

1. An electron beam welding apparatus for joining a pair of metal edges, comprising a plurality of welding guns mounted in speced aligned relation along a weld line provided by said edges, each gun having means to establish a concentrated welding beam generally corresponding to the weld line and each having a deflection means to deflect the beam along said weld line at least to the end of the scan to form a continuous weld, an inner seal assembly adapted to overlie said weld line, an outer seal assembly adapted to overlie the weld line and interconnected to said inner seal assembly, said seal assemblies including chambers defining a welding chamber to enclose said weld line, and said plurality of electron beam guns being secured to said seal assemblies and being mounted to establish beams in said welding chamber projecting perpendicular to said weld line, and said outer seal assembly having a cavity aligned with the longitudinal weld line, and said welding guns being connected to project the welding beams into said cavity and to weld said metal edges forming the weld line when actuated, and said inner seal assembly having means to deflect the welding beams backwardly onto the welded edges to post heat said welded edges.

2. An electron beam welding apparatus for joining a pair of metal edges, inner and outer seal assemblies adapted to overlie the metal edges and interconnected at the respective ends thereof to define a welding chamber to enclose the metal edges, a first series of welding guns mounted in fixed position on said seal assembly in spaced aligned relation along the metal edges, each gun having an anode and a cathode and a beam passageway aligned with an opening in the anode and cathode, valve means associated with each passageway and adapted to be actuated to open or close said passageway, a second series of welding guns mounted in fixed position on said seal assembly in spaced aligned relation along the metal edges and opposite to said first series of guns, each of said second series of guns having an anode and a cathode and a beam passageway and valve means adapted to be actuated to open or close said passageway, the valve in each gun passageway permitting any gun to be shut off for repair or removal and an opposite gun to be actuated by opening of the valve associated with such gun so that the guns along the metal edges may be fired simultaneously to provide a continuous uninterrupted weld of the edges even though several guns or opposite sides of the apparatus may be down for repair or replacement.

References Cited

UNITED STATES PATENTS

| | | | |
|---|---|---|---|
| 3,136,882 | 6/1964 | Radtke | 219—121 |
| 3,151,231 | 9/1964 | Steigerwald | 219—121 |
| 3,258,576 | 6/1966 | Schleich et al. | 219—121 |
| 3,264,004 | 8/1966 | Sciaky | 219—121 |
| 3,301,993 | 1/1967 | Boyd et al. | 219—121 |
| 3,325,620 | 6/1967 | Hunt et al. | 219—121 |
| 3,351,731 | 11/1967 | Tanaka | 219—121 |
| 3,389,240 | 6/1968 | Sciaky | 219—121 |
| 3,136,883 | 6/1964 | Radtke | 219—121 |
| 3,219,792 | 11/1965 | Pederson | 219—121 |
| 3,391,268 | 7/1968 | Libby et al. | 219—124 |
| 3,426,173 | 2/1969 | Steigerwald | 219—121 |
| 3,430,029 | 2/1969 | Hinrichs | 219—121 |
| 3,183,563 | 5/1965 | Smith | 219—121 |
| 3,303,320 | 2/1967 | Muller | 219—121 |
| 3,325,620 | 6/1967 | Hunt et al. | 219—121 |
| 3,441,709 | 4/1969 | Martocci | 219—121 |

JOSEPH V. TRUHE, Primary Examiner

R. E. O'NEIL, Assistant Examiner

U.S. Cl. X.R.

219—60, 72